United States Patent
Ragner et al.

(10) Patent No.: US 6,581,974 B1
(45) Date of Patent: Jun. 24, 2003

(54) PIVOT ADAPTOR ATTACHMENT FOR VACUUM CLEANERS

(75) Inventors: Gary Dean Ragner, Gainesville, FL (US); Mark Douglas Reed, Saint Louis, MO (US)

(73) Assignee: Ragner Manufacturing, LLC, Gainesville, FL (US)

(*) Notice: Subject to any disclaimer, the term of this patent is extended or adjusted under 35 U.S.C. 154(b) by 0 days.

(21) Appl. No.: 10/254,472

(22) Filed: Sep. 25, 2002

Related U.S. Application Data (60) Provisional application No. 60/326,106, filed on Sep. 29, 2001.

(51) Int. Cl.[7] ............................................... F16L 27/00
(52) U.S. Cl. .......................... 285/7; 285/184; 285/12; 285/278
(58) Field of Search .......................... 285/7, 184, 12, 285/272, 332, 278, 280

(56) References Cited

U.S. PATENT DOCUMENTS

| | | | |
|---|---|---|---|
| 101,603 A | * 4/1870 | Field .......................... 285/184 |
| 882,574 A | * 3/1908 | Moukos ....................... 15/411 |
| 981,705 A | 1/1911 | Spencer |
| 1,012,195 A | 12/1911 | English |
| 1,104,148 A | 7/1914 | Spencer |
| 1,173,718 A | * 2/1916 | Hirst .......................... 285/12 |
| 1,285,849 A | 11/1918 | Walling |
| 1,756,094 A | 4/1930 | McGuirk |
| 1,838,481 A | 12/1931 | Gudka |
| 2,203,088 A | * 6/1940 | Hansson ...................... 285/7 |
| 2,528,599 A | * 11/1950 | Loether ...................... 401/290 |
| 2,581,047 A | 1/1952 | Salmond |
| 2,786,698 A | 3/1957 | Bard |
| 3,565,464 A | 2/1971 | Wolf |
| 4,099,744 A | 7/1978 | Kutnyak |
| 4,133,312 A | * 1/1979 | Burd .......................... 604/8 |
| 4,309,048 A | * 1/1982 | Ahlf et al. .................. 285/7 |
| 4,345,805 A | 8/1982 | Finley |
| 4,369,781 A | * 1/1983 | Gilson et al. .............. 604/403 |
| 5,044,674 A | 9/1991 | Hendrickson |
| 5,064,226 A | * 11/1991 | Klas .......................... 285/184 |
| 5,410,776 A | * 5/1995 | Schneider ................... 15/398 |
| 5,472,346 A | 12/1995 | Gray |
| 5,720,501 A | 2/1998 | Ortloff |
| 5,927,758 A | * 7/1999 | Carlsson ..................... 285/7 |
| 6,209,925 B1 | 4/2001 | Edin |
| 6,257,505 B1 | * 7/2001 | Wang .......................... 239/526 |

\* cited by examiner

*Primary Examiner*—Eric K. Nicholson

(57) ABSTRACT

The disclosed swivel adaptor (20) is assembled into two sections: tool member (40), and adaptor member (60). These two sections are pivotally attached, and can pivot with respect to each other around pivot axis (54). Pivot axis (54) is angled off-axis with respect to the longitudinal axises of the adaptor sections to allow various angled positions for adaptor (20). The angle between the tool port end (42) and adaptor port end (64) being adjustable between an in-line position where members (40) and (60) form a relatively straight adaptor, and a plurality of angled positions where the longitudinal axises of ports (42) and (64) are not parallel. Adaptor (20) has an pivotal air passageway connecting end (45) to end (65). In the straight position, tabs (72) snap into place to provide a holding force to keep the two sections from pivoting during use. By applying a sufficient twisting force on the two sections, tab (72) slips loose and the two sections can rotate about axis (54). Tool member (40) is designed to fit into standard vacuum cleaner nozzles. Adaptor member (60) is designed to fit onto both vacuum wand hoses and vacuum wand ports.

20 Claims, 4 Drawing Sheets

PIVOT ADAPTOR ATTACHMENT FOR VACUUM CLEANERS

CROSS-REFERENCE TO RELATED APPLICATIONS

This utility application claims priority from U.S. Provisional Application Ser. No. 60/326,106 filed on Sep. 29, 2001, which has Disclosure Document No. 498706 filed on Aug. 20, 2001 attached to it.

BACKGROUND

This invention is related to vacuum cleaner attachments for removable attachment on the end of a vacuum hose and more specifically to vacuum cleaner connectors, which adapt multiple vacuum cleaner hose ends to a specific vacuum tool suction port size.

BACKGROUND—DESCRIPTION OF PRIOR ART

In the vacuum industry, there are two basic styles of vacuum cleaners, (herein vacuums): upright and canister. For the upright design, the vacuum is given a handle, which allows a user to push a power head across the floor for cleaning. A rotary brush is often used to vibrate dirt and dust out of the carpets. Recently, upright vacuums have also been including a vacuum hose (suction hose) that comprises a flexible hose leading from the vacuum cleaner body to a hose end (or hose wand) for cleaning. Many vacuum tools exist for attachment to these hose ends for cleaning different types of surfaces (i.e. upholstery tool, crevice tool, dust brush, etc.). For canister style vacuums, the majority of the hardware is placed in a canister that rolls on the floor, is carried by hand, or by shoulder strap. A flexible vacuum hose leads from the canister to a hose end or wand. Often electrical power is provided to this hose end to operate power heads with rotary agitators similar to upright vacuums. For cleaning hard floors, and above floor surfaces, multiple vacuum tools exist that attach to the hose end (or wand) to be used for cleaning. Both styles of vacuum cleaners provide hose extensions that may be attached to the hose wand to extend the reach of vacuum tools. The disclosed pivot adaptor (vacuum cleaner connector) works with both canister and upright style vacuum cleaners and is designed to attach between the hose wand and a vacuum tool.

With today's world market, many foreign vacuums, and some domestic vacuums, do not use the standard 1.25 inch diameter hose conduit style wand that is used by approximately 85% of all vacuums sold. Throughout this application we will use the phrase "standard 1.25 inch hose end", or similar phrase, to describe the vacuum industry standard hose conduit end. This standard 1.25 inch hose conduit (wand) is formed by a cylindrical tube with a 1.25 inch outside diameter that begins tapering (substantially linearly) one inch from the end of the hose to an outside diameter of 1.20 inches at the end of the hose end. Standard vacuum tools are designed to fit on these standard hose ends. For non-standard vacuums, the hose wand has a modified end that will not attach to the standard 1.25 inch vacuum nozzles. To solve this problem, manufactures have provided adaptors that attach to the non-standard hose end and modify the hose end to allow standard vacuum nozzles to be attached. These adaptors consist of a straight tubular piece of plastic or metal with one end designed to fit a multitude of vacuum cleaner hose ends and a second tool end designed to attach to a standard 1.25 inch vacuum tool. There are also other adaptors for specific brands of vacuums, which allow non-standard vacuum tools to be used. These straight adaptors where not found in the patent database and may simply be a public domain invention.

While many adaptors of simple straight tube style exist, there are no known vacuum hose adaptor attachments that include an off-axis pivot joint or swivel as shown in this application. Many pivotal hose wands were found, such as, U.S. Pat. No. 5,472,346 to Gray, U.S. Pat. No. 4,345,805 to Finley, and U.S. Pat. No. 4,099,744 to Kutnyak, where the hose wand has an axial pivot joint that allows the hose to rotate with respect to the wand end. However, these designs fail to use friction fit attachment ports and also fail to provided the off-axis pivot joint needed to produce the beneficial functions provided by the Applicants' Invention. They also show now means to adapt their pivot device to multiple vacuums with different vacuum hose and/or port sizes.

U.S. Pat. No. 981,705 to Spencer, U.S. Pat. No. 2,786,698 to Bard, U.S. Pat. No. 5,044,674 to Hendrickson, and U.S. Pat. No. 5,720,501 to Ortloff all show swivel joint piping that place their pivot axis at 90 degrees with respect to the connector ends. None are designed specifically for vacuum cleaners. Furthermore, their perpendicular orientation of the pivot axis with respect to the connector ends prevents these swivel joints from being able to be effectively used with an upholstery tool for use on a hard floor, and also would make other vacuum tools awkward to use.

U.S. Pat. No. 1,012,195 to English describes a multi-part device which uses a flexible middle section to allow pivoting of a suction cleaning end. However, the construction is very complex and requires two hands to operate. No pivot joint is shown and no means for attachment of multiple hose ends and/or vacuum tools is shown U.S. Pat. No. 1,285,849 to Walling, U.S. Pat. No. 1,756,094 to McGuirk, and U.S. Pat. No. 2,581,047 to Salmond all show plumbing fittings with an off-axis swivel. These designs, because they are for a different field, are not designed to pivot while in operation, but are locked into a particular angle during installation. None of these patents suggest they could be used with vacuum cleaners.

U.S. Pat. No. 1,104,148 to Spencer shows a cleaning tool having a swivel joint axis that is parallel to the tool port and a curved handle that is off-axis to the swivel joint. The cleaning tool is not designed for adapting other vacuum tools and does not provide a friction fit to easily attach and remove from other hoses or other tools.

U.S. Pat. No. 1,838,481 to Gudka shows a cleaning and polishing apparatus with a substantially 90-degree off-axis pivot joint. The pivot joint is not removable, and is not designed to adapt to other tools. Also, even if it were modified to become an adaptor, the pivot joint is not workable for use with many. vacuum tools because the angle of the pivot joint is perpendicular to the attachment point and also because no friction is provided.

U.S. Pat. No. 3,565,464 to Wolf shows a swivel coupler that provides axial pivoting and removable attachment to two members. The pivot axis is aligned with the swivel coupler (aligned with longitudinal axis of swivel) and does not show an off axis swivel like the one shown by the Applicants. If Wolf's design were modified for attachment to a vacuum tool it would still only provide axial pivoting and not provide the angle changing properties of the Applicants' invention. The drawings in Wolfs patent seen to show the same function as the Applicants' design (thought in a much larger device) but actually the angle changing ability comes from use of three swivel couplers. The applicants' device requires only a single pivot joint to accomplish the same range of angles.

U.S. Pat. No. 6,209,925 B1 to Edin shows a turn shaft for a vacuum cleaner with an off-axis connector for use specifically with vacuum tools having an axial pivot joint. The center off-axis connector does not pivot during use, but must be manually disengaged, rotated, and locked back together in one of two configurations. Edin's design includes additional angled hose sections in the shaft to provide the proper angled positions. The device is not designed as an adaptor for attachment to different vacuum cleaner hose wands and its length makes it difficult to use with above floor cleaning tools. Plus, the distance between the vacuum tool and the pivot joint is greater than 12 inches. This makes it impractical to use a standard upholstery tool to get under furniture (normal pivot operation of Edin's design is not workable with standard upholstery tools because it requires a axial pivot joint at the tool in order to work properly). The Applicants' device accomplishes better motion control, more functionality, and in a much more compact size while using only one joint instead of two.

No prior art was found that showed examples of an adaptor attachment designed for attachment to both male and female style hose wand ends. It should be noted that until one places a swivel joint on an adaptor attachment there is really no known need to provide attachment for standard 1.25 inch male hose ends because standard vacuum tools can be used without the adaptor. It is only when the functionality of an off-axis pivot joint is needed that the adaptor member 60 needs to fit on most models and styles of vacuum hoses. Furthermore, no prior art was found that showed a vacuum hose adaptor with a single off-axis pivot joint for connecting hose wands to vacuum tools.

SUMMERY

The disclosed pivot adaptor (or swivel adaptor) is designed to adapt standard 1.25 inch diameter vacuum tools (i.e. dust brush, upholstery tool, crevice tool, etc.) to multiple kinds of vacuum hose wand ends, including both male and female style hose ends. The disclosed pivot adaptor attachment allows standard vacuum tools to provide functions that until now have been unknown in the vacuum cleaner industry. These added functions including: using a dust brush to clean high horizontal surfaces; using an upholstery tool to cleaning high horizontal surfaces; using a dust brush, crevice tool, or upholstery tool to clean difficult to reach surfaces (strange angle); using a crevice tool to clean high recessed surfaces; using a standard upholstery tool as an effective bard floor tool; and etc.

The disclosed invention, pivot adaptor 20, comprises an adaptor member 60 and a tool member 40 with a pivot joint defined on each end where they are pivotally connected. The pivot plane for these two pieces is at an acute angle 74 with respect to the longitudinal axis of members 40 and 60, so that pivot adaptor 20 may rotated to transition between a relatively straight configuration (see FIG. 2) and an angled configuration (see FIG. 3). While this straight configuration is desirable, it is not vital to the operation of the pivot adaptor. The pivot joint, or swivel joint, also provides internal friction, which allows the adaptor to hold in a specific orientation while being used. This friction force is sufficient for adaptor 20 to hold its position during normal use, but can still be easily pivoted by applying slightly more rotational force. This holding friction may also be provided by a click-in-place system where tabs and notches interact to provide high "friction" positions as the pivot joint is rotated. This allows the adaptor to provide stable orientations for use, while at the same time allowing easy rotation between these orientations.

Adaptor member 60 is designed for removable attachment by friction fit to a wide variety of vacuum cleaner hose wand ends. This includes both standard 1.25 inch diameter hoses, which member 60 is inserted over to contact surface 66, and non-standard female port sizes as small as 1.32 inch diameter, which member 60 is inserted inside to contact surface 64. A friction fit for both these surfaces is desirable because it allows fast connecting and removal from the hose wand and it produces a nearly air tight fit. Because of the taper on most vacuum hose wand ends the disclosed pivot adaptor can connect to hose diameters from 1.15 to 1.30 inches on the inside of member 60 and 1.33 to 1.52 inches diameter hose ports on its exterior (1.52" with ring 63). The gap between these sizes is due to the wall thickness at adaptor port end 65. This covers most vacuums made today. Very few vacuums use female ports smaller than 1.33 inches and very few vacuums use male hose ends larger than 1.30. Kirby's Company's 1.30 inch diameter hose end is one example of a larger than the standard conduit style hose end, but still attaches to the disclosed adaptor because its hose end tapers to 1.23 inches. The unique thin-wall design of end 65 allows nearly complete coverage of diameter sizes since the thin end wall obstructs a very small diameter range. By making end wall 65 very thin, most of the adaptors surface is available to slide onto a male hose end or into a female hose port (see FIGS. 5 and 6).

On the other end of pivot adaptor 20 is tool member 40. Tool port surface 42 is designed for removable attachment by friction fit into standard 1.25 inch vacuum nozzles, but may be designed for whatever style and size nozzles desired. For example, the disclosed pivot adaptor may adapt specialty vacuum nozzles to fit on most vacuums in existence today. Tool port surface 42 may also be designed to fit on multiple sized nozzles much like adaptor port on member 60 attaches to multiple sized hose wands.

OBJECTIVES AND ADVANTAGES

Accordingly, several objects and advantages of our invention are:
a) To adapt many different vacuum cleaner hose sizes and styles for use with standard 1.25 inch port diameter vacuum tools (vacuum tool attachments).
b) To provide pivotal action for non-pivoting vacuum tools.
c) To allow a non-pivoting upholstery tool to be pivoted for use like a standard floor tool with a pivot, thereby allowing it to get under low furniture by twisting the hose wand attached to the pivot adaptor.
d) To allow a standard upholstery tool to be used to vacuum the tops of high furniture without the need for chair or ladder to stand on by angling the adaptor at nearly a right angle.
e) To allow standard dust brush to be angled for cleaning the top of high objects, such as, ceiling fan blades and book shelves (see FIG. 4).
f) To allow standard crevice tools to be angled for cleaning the top of high objects, such as, the tops of ceiling fan motors and above vertical blind supports.
g) To allow foreign vacuums with vacuum ports (hole instead of a tube) on the end of their hose wand to convert the port for use with standard 1.25 inch vacuum tools.

h) To provide a pivot for changing the orientation of vacuum tools when used on standard and non-standard vacuums.

i) To allow vacuum hose nozzles designed for the pivot adaptor to be used on a variety of different vacuum cleaner machines.

j) To allow vacuum attachments for one vacuum to be used on a non-standard vacuum.

k) To provide a pivot adaptor that has internal friction built into its pivot joint to provide sufficient friction for normal use of vacuum tools with it, but small enough friction to allow pivoting the adaptor when desired.

l) To provide at least two snap-locking orientations, one in the straight position, and a second at maximum angle, while providing sufficient holding force to allow normal use of nozzle tools.

m) To allow stable positions for a vacuum tool when the adaptor is pivoted to different angles (either through sliding friction and/or snap and lock structures.

n) To allow an upholstery tool (no pivot) to be used effectively as a floor tool o) To provide an adaptor port where standard 1.25 " diameter hose wands fit inside the port and the outside of the port is designed to fit inside port style hose ends.

p) To provide a round adaptor port which tapers toward its attachment end on both the inside and outside diameters. That is, surface 64 narrowing on the outside and surface 66 expanding on the inside as one moves toward adaptor port end 65. Attachment end 65 comes to a very thin edge because of this arrangement, which allows the thin walls to flex and communicate with most port sizes larger and smaller than the port diameter, including port sizes the same size as the adaptor port.

DETAILED DESCRIPTION OF THE PREFERRED EMBODIMENTS

Figures 1, 1A:
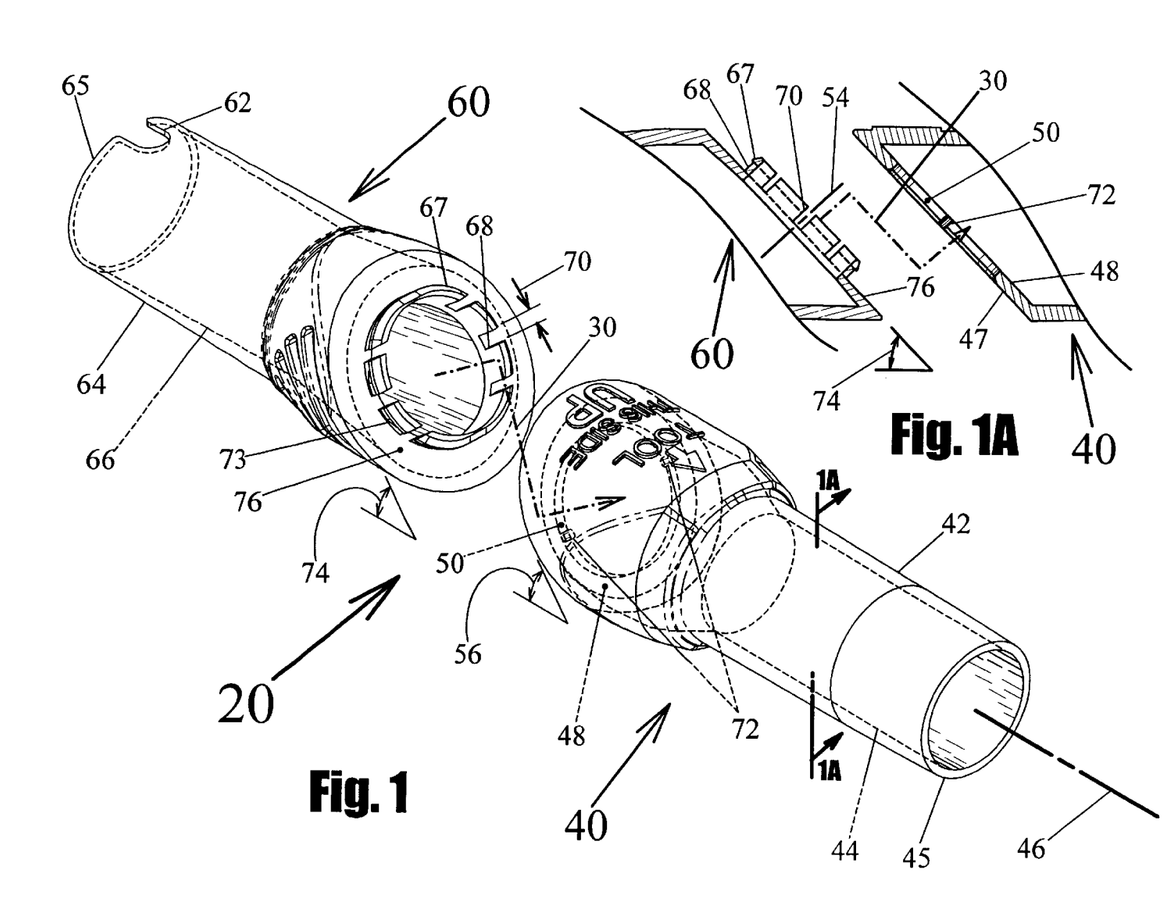
FIG. 1 Exploded view of pivot adaptor.
FIG. 1A Pivot adaptor exploded and sectioned longitudinally to show the pivot joint.

In FIG. 1, we see an exploded view of pivot adaptor 20. For this particular design, adaptor 20 is made from two separate injection molded plastic parts: 1) tool member 40, and 2) adaptor member 60. Tool member 40 having a tool port end 42 comprising an elongated cylindrical tube, inner port air channel 44, and port end 45, and a tool pivot end comprising angled mating surface 47, female port opening 50, interior surface 48 and tabs 72. Tool port 42 defines an elongated tube with a shape similar to a standard 1.25 inch vacuum hose wand ends, with approximately a 1.25 inch diameter outside diameter, and a 1.0 inch long taper to approximately 1.20 inch diameter at end 45. Female port opening 50 provides an air passageway that connects to air channel 44. Thus, tool member 40 is substantially a hollow tube with air channel 44 passing longitudinally through it to allow air to pass from port end 45 to female port 50. Tool port surface 42 is designed for removable attachment by friction fit to vacuum nozzle tools for cleaning with vacuum cleaner suction hoses. Adaptor member 60 has an adaptor port end comprising elongated cylindrical conduit surface 64, inner port air channel surface 66, notch 62 and port end 65, and an adaptor pivot end comprising ring shaped tube 68, tab ring 69, ramps 73, and notches 70 cut axially into tube 68. Ring tube 68 provides a port through the adaptor member's center that connects with channel 66 to provide continuous air channel between end 65 and ring port 68. Elongated cylindrical conduit 64, and inner channel 66 are designed for removable attachment by friction fit to a variety of vacuum cleaner hose wand ends. This allows pivot adaptor 20 to be used on multiple styles (and sizes) of vacuum cleaner hose wands.

Tool member 40 in this example is designed for use with standard 1.25 inch diameter vacuum hose wand ends, but the reader should realize that tool member 40 shown in this design can easily be resized for other nozzle tool set sizes (and styles). That is, tool port (or tube) 42 may be designed for non-standard nozzle tools. With port surface 42 designed for 1.25 inch tools, pivot adaptor 20 can attach standard 1.25 inch tools to a wide range of standard and non-standard vacuum cleaners. Pivot adaptor 20 is specifically made so that nearly all vacuums presently on the market can use this adaptor to attach standard 1.25 inch sized vacuum nozzle tools to their vacuum hose. Air channel 44 defines an elongated cylinder having a longitudinal axis, which is aligned with axis line 46 in FIGS. 1 and 2. Axis line 46 shows the orientation of the longitudinal axis for air channels 44 and 66 in their shown orientations in FIGS. 1 and 2. As seen in FIG. 3, the longitudinal axis for air channel 44 may move with respect to the longitudinal axis for air channel 66. In FIG. 3, the orientation of the longitudinal axises for air channels 44 and 66 have pivoted with respect to each other to form an angle 86. If member 40 is made longer than 12 inches (one foot), a standard upholstery tools will cause member 40 to extend upward to a significant height. Since the upholstery tool must remain flush against the floor for cleaning, this means that the upholstery tool and pivot adaptor 20 will be too tall to properly fit under low-lying furniture no matter what angle the pivot adaptor is swiveled to. In addition, making member 40 longer will frustrate its easy use with other cleaning tools, such as, dust brushes, and crevice tools. The long extension length of member 40 will require high amounts of friction within the pivot joint to keep adaptor 20 from pivoting unintentionally while using such tools. This high amount of friction will make it difficult to use upholstery tools on hard floors since it will be difficult to generate sufficient torque with the upholstery tool's short arms to rotate the pivot adaptor by simply twisting the vacuum hose wand. The user would need to physically grab both sides of the pivot adaptor to rotate it. Because of these reasons, the preferred embodiment makes tool member 40 as short as possible while still providing its pivotal and removable attachment functions.

Adaptor member 60 may be attached to both male and female style vacuum wand ends with diameters from 1.15 to 1.42 inches. Modifications to surfaces 64 and/or 66 with an additional ring structures like surface ring 63, FIGS. 5 & 6) may allow a larger diameter range. Adaptor member 60 is designed for removable attachment to a wide variety of vacuum cleaner suction hose conduits (hose wand end). Both the inside surface 66 and outside surface 64 are used for attachment to different style vacuum hose ends. Female style hose wand ports connect to the outside surface 64 of member 60, and male hose wand ends connect to inside surface 66 of member 60. Surface 64 tapers radially inward toward end 65, while surface 66 tapers radially outward toward end 65. A realistic wall thickness at end 65 is 0.04 inches, but the adaptor may be designed even thinner. Because the wall thickness is so thin, deformation of the plastic in adaptor port end 65 may allow it to connect to nearly a continuous range of hose end sizes. For example, if the wall thickness at end 65 is 0.01 inches, (inside diameter of 1.24 and an outside diameter of 1.26 inches), then end 65 can easily deform to accommodate sizes in between 1.24 and 1.26 inches for both ports (female) and hoses (male). A 1.25 inch standard hose end would expand the wand end to 1.25 inches, and a 1.25 inch hose port (female) would easily compress the hose end of the adaptor because of the thinness of the material there. The taper on surfaces 64 and 66 also provide a friction fit for the hoses and ports they are respectfully attached to. If these surfaces taper too quickly, the connection may slip because of too large a ratio between friction force parallel to surface 64 or 66 and radial compression force normal to surface 64 or 66. For this design the tapers are approximately 3.5 degrees. Button notch 62 on the end of port 64 is designed to receive the locking button, which is found on some vacuum hose ends (see button 81 in FIG. 4). Air channel 66 defines an elongated cylinder shape having a longitudinal axis that is aligned with axis line 46 in FIGS. 1 and 2. This longitudinal axis is in the general direction of airflow through air channel 66. Note that the angle between the longitudinal axis of air channel 66 and the longitudinal axis for air channel 44 may be changed by simply pivoting tool member 40 with respect to adaptor member 60, or vice-a-versa.

A pivot joint near the middle of the adaptor is formed by the mating of the tool pivot end and the adaptor pivot end. This pivot joint allows pivot adaptor 20 to change the angle between adaptor member 60 and the tool member 40 (adjusting angle between longitudinal axises for air channels 44 and 66). This pivoting action of the adaptor allows standard tools to be used for additional functions, such as, angling an upholstery tool (or dust brush, see FIG. 4) to clean the top of a tall bookcase. The pivot adaptor may allow upholstery tools to be used as floor tools where the upholstery tool may remain flush to the floor while a hose extension is angled parallel to the floor to allow the upholstery tool to slide under a low-lying piece of furniture. In FIGS. 1 and 1A, members 40 and 60 define a pivot joint comprised of female port 50 and ring shaped tube 68. Tube 68 further defines a ring tab 67, notches 70 and ramps 73 molded onto it. Tube 68 and ring 67 have notches 70 cut out around its circumference to form a hollow cylindrical ring with gaps in it. Notches 70 allow ring 68 to flex inward for snapping members 40 and 60 together during assembly and to provide a tight fit against port 50 on tool member 40. Port 50 is designed to receive male port ring 68 and provide pivotal joint surfaces. Inner surface 48 on the inside of port 50 is designed to interact with ring tabs 67 molded on the end portion of port 68. On port surface 50 are placed two tabs 72 which protrude radially inward from port 50 and are designed to engage notches 70. Tabs 72 and notches 70 are spaced 180 degrees apart on female port 50 and male ring port 68 respectfully. The width of notch 70 is designed to receive tab 72 and securely hold tab 72 and also allow tabs 72 to disengage from notches 70 when rotary force is applied to the pivot joint between parts 40 and 60. The other slots shown around port 68 are used to allow flexing of port 68 radially inward during assembly, but may also be used as a engagement notch similar to notches 70, to engage tabs 72. This engagement of tabs 72 and notches 70 provide a friction force that helps pivot adaptor 20 to hold a particular angle when cleaning with a vacuum tool. Tabs 72 may be made more resilient (larger movement) by providing a cantilever arm on member 40 that tabs 72 would mount on. This would allow more pronounced friction differences between the friction with the tabs and notches engaged and when the tabs 72 were sliding on ring 68. Without this friction, many cleaning tasks cannot be done because the vacuum tool would just flop around at the end of adaptor 20. This friction must be sufficient for vacuum tools to be used; while at the same time should allow the user to easily pivot the pivot adaptor when desired. This balance is important for the ergonomic use of pivot adaptor 20. Pivot axis 54 defines the axis of rotation for parts 40 and 60, and is itself defined by the rotating interaction between female port 50 and ring port 68. Ring port 68 may rotate within port 50 to provide pivoting action for pivot adaptor 20. Pivot axis 54 is also defined by circular surfaces 76 and 47, which slide against one another during operation. Ring shaped tab 67 is molded on the top end of tube 68 and extends radially to a larger diameter than tube 68. Tab 67 thus, forms a ridge that is apposed to surface 76 and designed to grip against inside surface 48 on port 50. Tab 67 interacts with surface 48 to hold surfaces 76 and 47 tightly together (see FIG. 1A) and provides a solid feel to adaptor 20 when members 40 and 60 are snapped together. Ramps 73 are molded into the outside surface of ring 68 between tab 67 and surface 76, and on both sides of gaps 70. The ramps 73 are designed to allow tabs 72 to slide easily into notch 70, but require considerably more force to turn tabs 72 out of notches 70.

FIG. 1A shows a longitudinal section view of pivot adaptor 20 seen in FIG. 1. Parts 40 and 60 are separated to more easily show their structure. Construction line 30 shows how the two parts are aligned and snapped together. Pivot axis 54 is located at the center of ports 68 and 50, and perpendicular (normal) to surfaces 76 and 47. The interaction of surface 50 with ring 68 keeps the two parts aligned with axis 54. Interaction between surfaces 76 and 47 on the bottom, and ring tab 67 and surface 48 on the top, provide for "thrust" forces along pivot joint axis 54 and hold parts 40 and 60 together.

In FIG. 1, construction line 30 shows how female port 50 on tool member 40 (tool portion) is snapped together over port 68 on adaptor member 60 (hose wand portion) to form pivot adaptor 20. Tool member 40 and adaptor member 60 have hollow air channels 44 and 66 respectfully, so that the combined parts 40 and 60 provide open-air passageway there through from end 45 to end 65. Tool member 40 also has an angled end surface 47 at an angle 56 (preferably between 40 to 50 degrees) from its longitudinal axis (axis of channels 44 and 66, identified by axis line 46 in FIGS. 1 and 2). Angled surface 47 has a round port 50 passing through it with a rim 48 on the interior. This rim 48 interacts with tabs 67 on ring shaped flanges 68 to pivotally hold parts 40 and 60 together. A passageway extends through the center of ring 68 and out end 65 to allow air to pass from one end of adaptor 20 to the other. When assembled, port 50 on part 40 pivots around flange 68 along its axis (normal to surfaces 76 and 47). Ring port 68 passes through hole 50 and tabs 67 snap fit against rim 48. Gaps 70 on ring port 68 allow the ring shaped flanges to bend radially inward when being pushed into hole 50 and allows snapping together parts 40 and 60. Gaps 70 also provide a "click in place" action as tabs 72 snap into gaps 70 when parts 40 and 60 are rotated with respect to each other at surfaces 76 and 47. Additional tabs 72 on the sidewall port surface 50 may be used to provide multiple places where notches 70 may lock into place as they pivot with respect to ring port 68. Tabs 72 and notches 70 may be eliminated if the pivot joint provides sufficient friction between the two members for proper operation of pivot adaptor 20. Surface 76 is at an acute angle 74 measured from the longitudinal axis of air channel 66. The longitudinal axis of channel 66 is aligned with axis line 46 in FIGS. 1 and 2. For the purposes of this application, the term "acute angle" is used to mean an angle less than ninety degrees and greater than zero degrees. Notice that pivot axis 54 forms an acute angle with respect to longitudinal axis of both air channels 44 and 66 except for angle 74 equal to 0 degrees, 90 degrees, 180 degree, 270 degrees, etc. Acute angle 74 of surface 76 may be the same as angle 56 of surface 47, which allows the longitudinal axises of channels 44 and 66 to become parallel to each other in at least one orientation. However, being parallel does not necessarily mean the longitudinal axises can align (in-line with each other) since there may be an offset distance at the pivot joint. For example, if surface 76 and ring port 68 are extended outward, normal to surface 76, then the center of the pivot joint will move away from being in-line (aligned) with axis line 46. The result is an offset distance between the longitudinal axis of channel 44 and the longitudinal axis of channel 66 when they were parallel. Likewise, surface 47 and female port 50 may also be extended normal to surface 47 to provide more offset. For the example, shown in FIGS. 1 through 4 the longitudinal axises do align because the center of the pivot joint is aligned with the longitudinal axises of channels 44 and 66, and because angles 56 and 74 are the same. Note, angles 56 and 74 do not have to be the same for proper operation of adaptor 20, but if the angles are significantly different (greater than 45 degree difference) the adaptors functionality may be degraded for specific uses. The middle portions of parts 40 and 60 may be reshaped in a variety of ways, including extended sections with corresponding extended air channels 44 and 66. Such additions may change the shape of the pivot adaptor to provide special functions for special situation. The shape of the parts may also be adjusted without significant change in the functional use of the pivot adaptor, such as with small offsets of the longitudinal axises (axises parallel, but not aligned) as described above.

Many alternative ways exists for providing a "snap in place" or "semi-locking" positions for the adaptor. For example, small bumps could be placed on surface 76 so that it interacts with notches on surface 47 to lock it into place or visa-versa. In general, a "click in place" every ninety degrees is ideal, but the user may want more (or less) locking positions. The straight in-line position (FIG. 2) and 180 degree position (FIG. 3) are the most critical holding positions, since dusting and upholstery vacuum tools often need a stable orientation of proper use. A continuous friction force between members 40 and 60 may also be used to provide stable orientations, but must provide sufficient holding force to allow normal cleaning with vacuum tools. A loose (too easily rotated) adaptor would make it difficult to properly use tools like a dust brush, which must be moved from side to side to clean surfaces.

Figure 2:
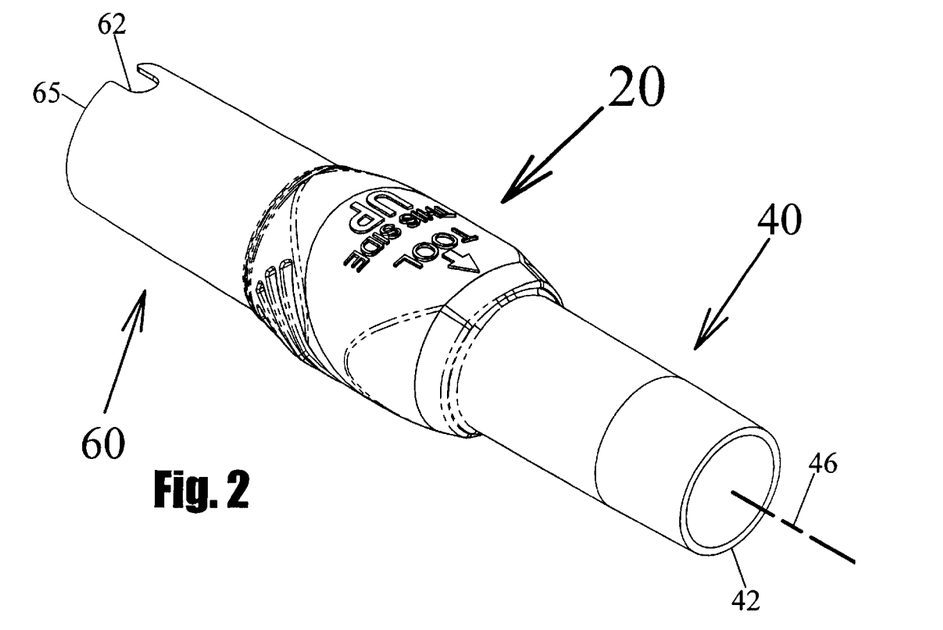
FIG. 2 Pivot adaptor oriented in a straight line.
Figure 3:
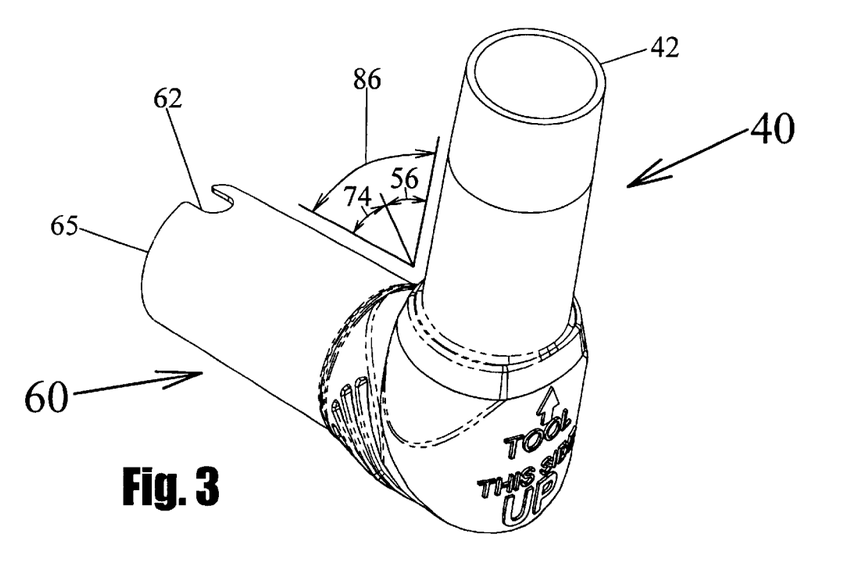
FIG. 3 Pivot adaptor oriented at maximum angle (180 degree rotation of pivot joint).

FIGS. 2 and 3, show the adaptor in FIG. 1 assembled for use and the two members (parts 40 and 60 snapped together along line 30) in-line to form a relatively straight adaptor having an air passageway through the adaptor from end 45 to end 65. In this straight position, tabs 72 have snapped into place in notch 70 and a corresponding notch on the opposite side of male port ring 68 to hold the two sections stationary relative to each other. By applying a sufficient twisting or rotational force on the two members, tab 72 slips loose from notch 70 and the two members can rotate around pivot axis 54 to a second locking position 180 degrees away as seen in FIG. 3.

Figure 5:
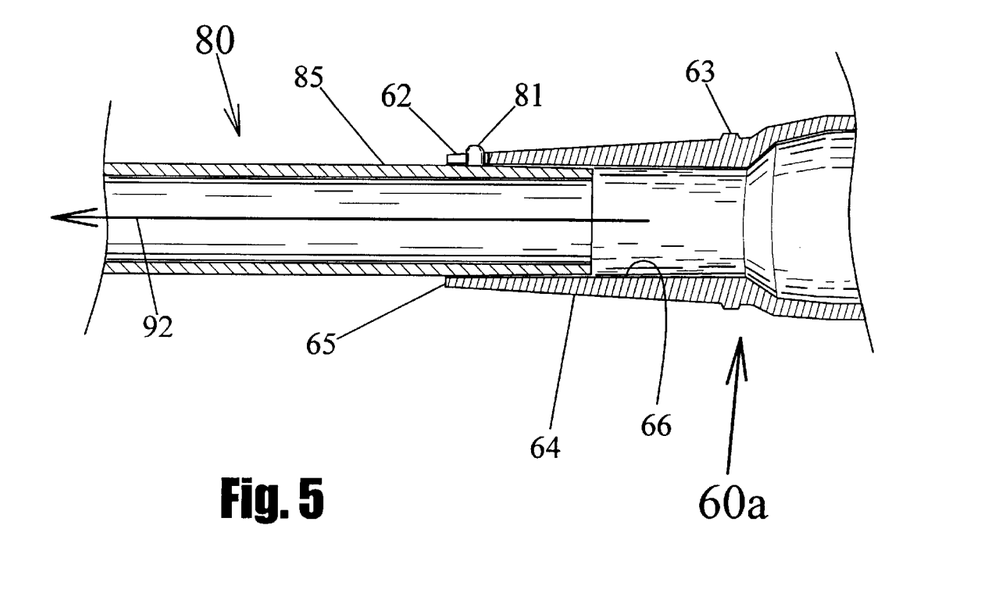
FIG. 5 Section view of pivot adaptor inserted on a standard 1.25 inch vacuum hose end.
Figure 6:
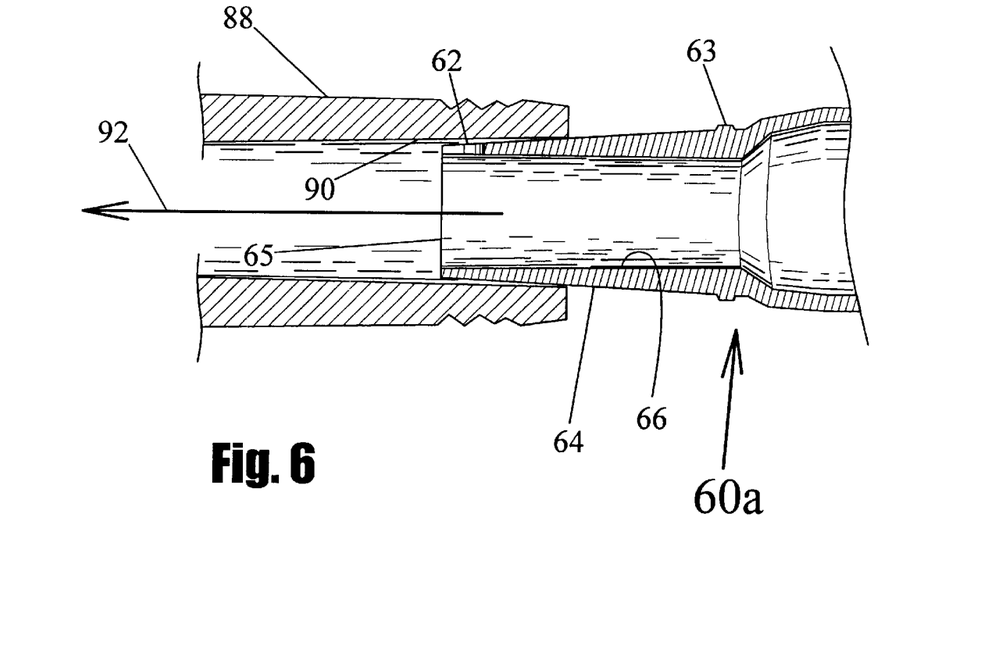
FIG. 6 Section view of pivot adaptor inserted into port style vacuum hose end.

In FIGS. 5 and 6, we see adaptor member 60*a* in section with a hose wand 80 in FIG. 5 and a port style wand 88 in FIG. 6. Adaptor member 60*a* is identical to adaptor member 60 except for a raised ring portion 63 on outer surface 64. Ring 63, in this example, is designed to have a diameter that specifically fit the female hose port on vacuums using a 1.50 to 1.52 inch port diameter, but may be made virtually any diameter. In both FIGS. 5 and 6, contact between the vacuum wand and adaptor member 60*a* provides a substantially air tight seal from the friction fit. Vacuum pressure from the vacuum cleaner pulls air through passageway 66 and down hose extension 80 as shown by airflow arrow 92. In FIG. 5, interior surface 66 is tapered to accept a standard 1.25 inch hose end and has a diameter of 1.25 inches at end 65, narrowing as one moves further into channel 66. The wall thickness at end 65 is only 0.04 inches, which allows it to easily conform for slightly off-sized hose ends and hose ports. While a 0.04 inch wall thickness works well, a thinner wall thickness could be used. It is possible to have the wall thickness go near zero at 65 to allow connecting to the maximum number of vacuum cleaner wand. With a near zero thickness, surfaces 64 and 66 would simply taper to a knife-edge. Such thin plastic sections, however, can be easily damaged. Notch 62 is designed to allow hose extensions and hose wands with a locking button 81 to be fully inserted into air channel 66 for a snug fit. Notch 62 interacting with button 81 keeps adaptor member 60*a* from twisting at the interface between surfaces 80 and 66. Tapered outer surface 64 is designed to fit into many female style wand port sizes on many different brands of vacuums. Tapered surface 64 goes from a diameter of 1.42 inches near ring 63 to a diameter of 1.33 inches at end 65. This taper allows surface 64 of member 60*a* to tightly fit into port 90 as it is forced in.

OPERATIONAL DESCRIPTION
FIGS. 1 through 6

When in use, members 40 and 60 are pivotally attached at port 50 and ring 68 respectfully to form pivot adaptor 20. Rotational force place on the pivot joint formed by ring 68 and port 50 allow members 40 and 60 to rotate relative to each other. Rotation occurs in the plane formed by surfaces 47 and 76, with surfaces 47 and 76 sliding against each other, and both members 40 and 60 rotating about axis 54 (see FIGS. 1A & 4). To operate the pivot adaptor, the user takes adaptor port end 65 and attaches it to their vacuum cleaner's hose wand. If the vacuum wand is a standard 1.25 inch hose end or smaller, the hose end will slide inside channel 66. If the vacuum is a female port style hose end, then tapered surface 64 slides into the female hose wand port. Adaptor member 60 is held in place on the hose end by compression fit and friction. In general, the taper on surfaces 64 and 66 should be less than five degrees for a strong friction hold. However, use of high friction materials could allow this taper angle to be greater. When installing on the hose end, the wording "THIS SIDE UP" should be facing upward and the adaptor should be configured in the straight-line condition (see FIG. 2). This allows tool member 40 to rotate downward when adaptor member 60 is rotated (see FIG. 4). With wording "THIS SIDE UP" facing upward and the pivot adaptor in its straight configuration, a vacuum nozzle tool is then attached over tool port 42. The nozzle tool is now ready to be used. Note that the pivot adaptor may be attached in other orientations to vacuum nozzle tools and/or hose wands to provide different operating angles for different uses.

If an upholstery tool is used on a hard floor surface, it need only be attached as described in the preceding paragraph and adaptor 20 is attached to a hose extension (which is attached to a hose wand) to reach the floor. In the straight in-line orientation, tabs 72 and notches 70 are engaged which tend to hold pivot adaptor 20 in that orientation. If the hose extension needs to be moved to a different angle with respect to the upholstery tool, such as vacuuming under a piece of furniture, the user simply twists the hose extension along its axis. The side arms of the upholstery tool interact with the floor to provide torque to tool member 40 and hold it in place while adaptor member 60 is pivoted (rotated) around axis 54. This rotating motion is possible because of the proper selection of angles 56 and 74, which allows pivot axis 54 to be oriented for receiving torque generated by the user by twisting the hose extension. Thus, the twisting of the hose extension (which is attached to adaptor member 60) causes the angle between the upholstery tool and the hose extension is changed. Continued twisting allows the user to lower the hose extension parallel to the floor for cleaning. Twisting the hose extension back again brings the hose extension back up to the in-line orientation, all while the upholstery tool remains flush against the floor. Notice that if tool member 40 is too long it will extend upward and block entry of the hose extension under low furniture, and also make the general use of the pivot adaptor with and upholstery tool awkward.

When cleaning with a dust brush, the dust brush is attached as described above, so that, in the straight position, pivot adaptor 20 allows the dust brush to be used normally. If a high surface needs to be dusted, the hose extension is rotated 180 degrees while the tool member 40 and the dust brush are held in position. The arrangement like that seen in FIG. 4 results, and dust brush 82 can easily dust surface 84, which would normally be very difficult to dust with any other vacuum system in existence. Upholstery and crevice tools can also use with the configuration shown in FIG. 4 to clean high surfaces. Pivot adaptor 20 may also be rotated to other intermediate position to clean other oddly angled surfaces (i.e. walls, sides of furniture, ceilings, underside of furniture such as the underside of tables and chairs, etc.).

Figure 4:
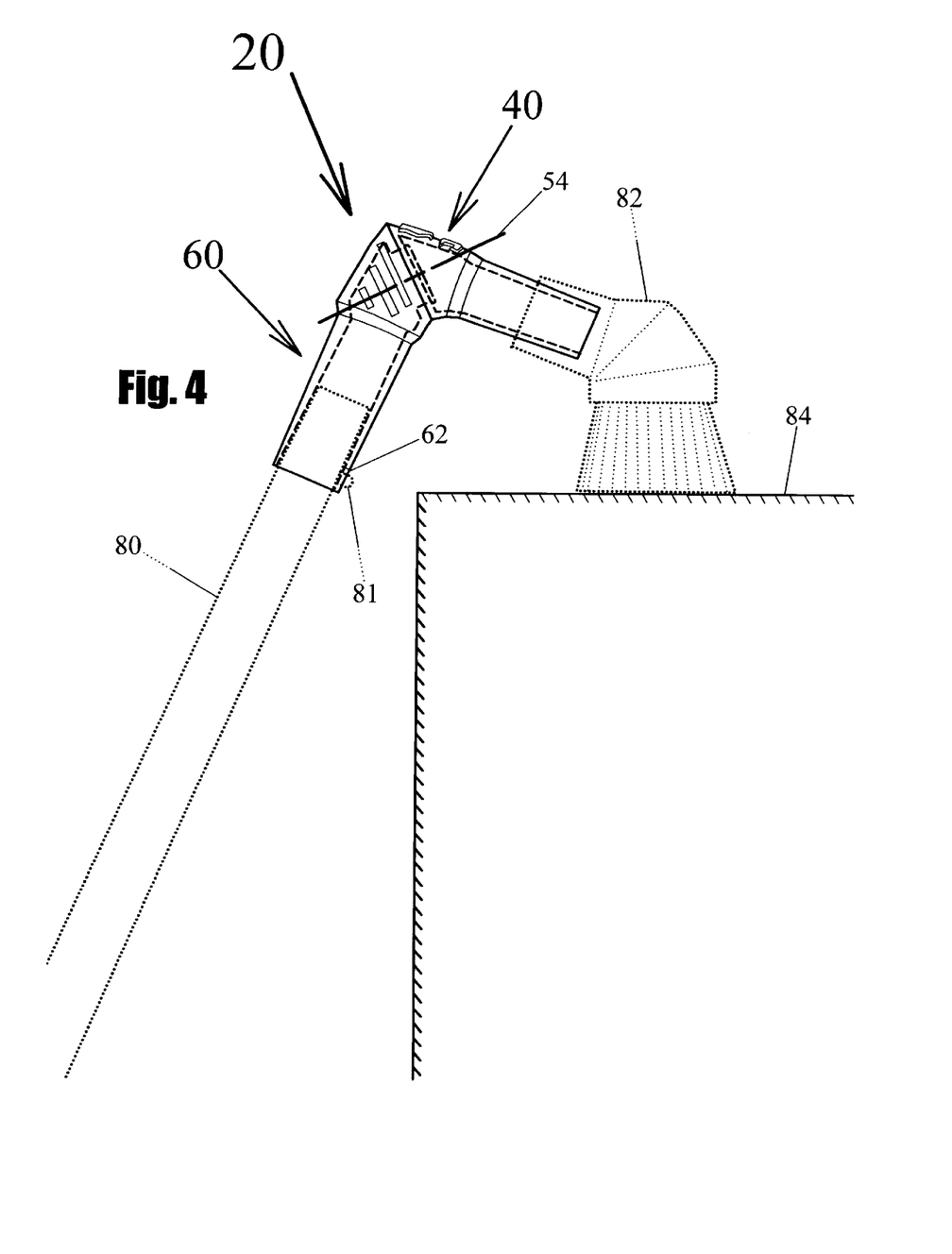
FIG. 4 Pivot adaptor oriented at maximum angle used in cleaning top of high surface.

Tabs 72 on member 40 and notches 70 on member 60 interact with each other to provide a stable straight-line configuration. The user may clean and dust with a tool on the end of the pivot adaptor without the pivot adaptor rotating unintentionally. However, if sufficient rotational force is placed on the pivot joint, tabs 72 and notches 70 will disengage from each other and members 40 and 60 may rotate relative to each other. The pivot adaptor members may be pivoted 360 degrees around the pivot joint's axis 54 for a variety of positions and functions. This rotation of the members with respect to each other allows pivot adaptor 20 to smoothly transition between a straight position (FIG. 2) and a maximum angled position (FIG. 3 angle 86). At 180 degrees of rotation from the straight orientation, pivot adaptor 20 is at its maximum angle, and tabs 72 and notches 70 once again engage with each other to provide a holding force. In this angled orientation, the pivot adaptor may be used to clean high surfaces as seen in FIG. 4. For this design, angle 86 is approximately 100 degrees, but may be nearly any angle depending on the angles selected for 56 and 74. Likewise, the straight position may be modified by simply making angles 56 and 74 have different values. If the angle 56 of surface 47 is not the same as the angle 74 of surface 76 then the adaptor will never be able to form a straight in-line position (unless additional angled sections exist in the body of either tool member 40 and/or adaptor member 60). The available methods for changing angles, offsets sections, and axises discussed above can provide numerous designs for special applications where special rotational abilities are needed.

FIG. 3 shows pivot adaptor 20 rotated 180 degrees about pivot joint axis 54 compared to adaptor 20 in FIG. 2. Notice that adaptor member 60 is in the same position in both FIG. 2 and FIG. 3. In FIG. 3, the orientation change is accomplished by rotating member 40 while holding member 60 stationary. Similar angle changes occur when rotating member 60 and holding tool member 40 stationary (see FIG. 4). The shown relative change in orientation is the result of having pivot axis 54 angled away from the longitudinal axis 46. Maximum angle 86 only occurs when parts 40 and 60 are rotated 180 degrees from their straight in-line position. At intermediate angles the pivot adaptor form a continuous range of angles that may be used to angle a vacuum tool on end 42 so it is flush against a surface. To do this, friction should be present in these additional orientations to provide a stable support for the vacuum tool. This friction may be supplied by additional tabs and/or notches or may be supplied by a sliding friction built into the pivot joint. This sliding friction can be created by many methods including just having tight fitting parts. The friction must not be too great otherwise, the tools become hard to change positions. This is especially important for using the upholstery tool on a hard floor where the pivot adaptor must be rotated by torque created by its interaction with the floor. If friction is too great, the pivot adaptor will not turn easily. If continuous friction is used in the pivot joint, this would allow a vacuum tool to be angled flush against nearly any surface (including walls and ceiling), while holding hose extension 80 at a comfortable angle.

FIG. 4 shows one of these functions with the adaptor member 60 twisted approximately 180 degrees from its straight position. With a nearly right angle bend in adaptor 20, dust brush tool 82 (crevice tool, upholstery tool, etc. may also be used) can be used to clean the tops of high book shelves 84, tops of doors, or other items that normally require a.chair or ladder to clean. Standard hose extension 80, with a standard 1.25 inch diameter hose end is fitted into port channel 66 to allow the user to easily raise the adaptor and dust brush to ceiling level. Tool port end 42 is pushed into dust brush tool. Locking button 81 slides into notch 62 to keep adaptor 20 from twisting within port 66. If additional locking positions are placed within the pivot joint (additional tabs 72 and/or additional notches 70) then dust brush 82 may be rotated to face sideways and may be used to easily dust walls or other angled surfaces.

FIGS. 5 and 6 show how the adaptor member 60*a* fits on different styles of vacuum cleaner hose wands. For these examples, member 60*a* operates the same as member 60. Ring 63 is added so that an additional larger diameter hose ports may be used. In FIG. 5, we see adaptor member 60*a* inserted over a standard 1.25 inch diameter hose wand extension end 80. Hose extension 80 forces its exterior surface 85 up against tapered inner surface 66 so that the end of hose extension 80 fits snugly inside adaptor member 60*a*. Button 81 slides into button notch 62 to resist hose extension 80 and adaptor member 60 from rotating with respect to each other. In FIG. 6 we see adaptor member 60*a* being placed in a vacuum cleaner hose wand port 88. Many foreign vacuum cleaners use a female port for vacuum tool attachment instead of a male hose end. These ports tend to be larger than the male hose wands so surface 64 will slide into nearly all existing vacuum cleaner hose wand ports. Exterior surface 64 of adaptor member 60*a* is used to snugly fit into these female hose ports. The tapered cylindrical shaped surface 64 can accommodate hose port sizes from 1.33 to 1.42 inches (or larger). If a port size is larger than 1.42 inches then ring shaped raised section 63 on surface 64 may be used to allow the adaptor member 60*a* to accommodate a large port sizes without necessarily increasing the overall length of part 60*a* compared to part 60. In this example, raised section 63 is designed with a diameter of 1.50 inches to provide connection to a "Hover Windtunnel" vacuum cleaner hose port, which has an entrance diameter of approximately 1.52 inches. Many different diameter raised sections may be used for specific port sizes.

SUMMARY, RAMIFICATIONS, AND SCOPE

The pivot adaptor presented here has many uses with a large variety of nozzle tools and vacuum cleaners. The off-axis pivoting action of adaptor 20 allows vacuum tools to be oriented in a multitude of angles to reach surfaces that are normally difficult to clean. The disclosed pivot adaptor's ability to easily reach high horizontal surfaces is unique to the industry. Before this time the only alternative was to use specialty tools or climb on a chair or ladder. The adaptor also allows an upholstery tool (no pivot) to be used effectively as a floor tool. It allows the hose wand and hose extension to rotate parallel to the floor while the upholstery tool remains in its optimum cleaning orientation with the floor. This type of action usually requires a floor tool that has a swivel built into it. The pivot adaptor is also designed to adapt standard nozzles for use with both male and female style vacuum hose ends. This allows most vacuum cleaners in production at this time to use standard 1.25 inch diameter vacuum nozzle tools.

Although the above description of the invention contains many specifications, these should not be viewed as limiting the scope of the invention. Instead, the above description should be considered illustrations of some of the presently preferred embodiments of this invention. For example, different size vacuum tools may become popular in the future, which would require the resizing of the tool end and/or hose end of the adaptor. In addition, surface 64 may be modified to provide connection to specific sized hose ports. Surface 64 may also accept cylindrical sleeves over it to create different diameter sections similarly to ring 63. These sleeves may be removable or interlock onto ridges on surface 64 to substantially lock them in place. The larger diameter sleeves may then be used to adapt to larger diameter female hose ports. Also, the body of the pivot adaptor may be altered and reshaped with additional extensions and angled portions to provide special functions, while still retaining the basic principle of the invention. Finally, the general shape of hose port 64 and tool port 42 need not be cylindrical. If a square, octagonal or other cross-sectional shape other than the circular cross-section shown in the figures, the pivot adaptor may be easily adapted to fit these odd shaped ports and hoses by simply reshaping the ports. Adaptor member 60 may be made much longer to provide the function of a hose extension with tool member 40 at one end. Finally, the male/female adaptor port discussed in this application appears to be unique to the industry and may have many uses other than its use here on a pivot adaptor. Thus, the configuration of surfaces 64 and 66 for connection to both male hose conduits, and female hose port, may be used in a multitude of other vacuum tools, specialty tools, vacuum hose extensions, adaptors, pivot adaptor, etc to provide attachment to multiple vacuum hose styles and sizes in a single product.

Thus, the scope of this invention should not be limited to the above examples but should be determined from the following claims.

We claim:

1. A vacuum cleaner connector for attachment to a vacuum cleaner hose end, comprising:
   a) an adaptor member, and;
   b) a tool member;
   c) wherein, said adaptor member comprising an adaptor port end, a adaptor pivot end, and a first air passageway through said adaptor member from said adaptor port end to said adaptor pivot end;
   d) wherein, said adaptor port end comprises an elongated conduit with less than five degrees taper for removable attachment by friction fit to a vacuum cleaner hose end, and said adaptor port end defining a first longitudinal axis aligned with the central axis of said elongated conduit;
   e) wherein, said tool member comprising a tool port end, a tool pivot end, and a second air passageway through said tool member from said tool port end to said tool pivot end;
   f) wherein, said tool port end comprises an elongated tube with a tapered exterior surface having less than five degrees of taper for removable attachment by friction fit to a vacuum cleaner tool, and said tool port end defining a second longitudinal axis aligned with the central axis of said elongated tube;
   g) further including, a pivot joint defined on said adaptor pivot end and said tool pivot end for pivotally connecting said adaptor member and said tool member to each other with said first and second air passageways forming a substantially sealed and continuous air passageway from the end of said adaptor port end to the end of said tool port end;
   h) wherein, said pivot joint defines an axis of rotation oriented at an acute angle with respect to both said first longitudinal axis and said second longitudinal axis, whereby a pivot angle between the first and second longitudinal axises may be changed by rotating said adaptor member with respect to said tool member
   i) wherein, a first pivot angle is defined by the acute angle between the first longitudinal axis and the axis of rotation, wherein a second pivot angle is defined by the acute angle between the second longitudinal axis and the axis of rotation; wherein said first and second pivot angles are within the range of ten degrees to eighty degrees; and
   j) wherein, the absolute value of the result of the first pivot angle minus the second pivot angle is less than ten degrees, whereby the first and second longitudinal axis can be rotated to less than ten degrees from the in-line position;
   k) wherein, the sum of the first and second pivot angles is greater than fifty degrees, whereby the first and second longitudinal axis can be rotated to greater than fifty degrees from the in-line position; and
   l) further including, a means for creating friction within the pivot joint to resist rotation of said pivot tool end with respect to said pivot adaptor end for hold said adaptor member and said tool member together at a stable angle during use, whereby said vacuum cleaner tool may be used for cleaning.

2. The vacuum cleaner connector in claim 1, wherein, said acute angle between said first longitudinal axis and said axis of rotation is different from said acute angle between said second longitudinal axis and said axis of rotation.

3. The vacuum cleaner connector in claim 1, wherein, said tool member having an overall length of less than twelve inches.

4. The vacuum cleaner connector in claim 1, wherein, the sum of the first and second pivot angles is greater than sixty degrees.

5. The vacuum cleaner connector in claim 1, wherein, the absolute value of the result of the first pivot angle minus the second pivot angle is less than five degrees and the sum of the first and second pivot angles is greater than seventy degrees.

6. The vacuum cleaner connector in claim 1, wherein, the absolute value of the result of the first pivot angle minus the second pivot angle is less than five degrees and the sum of the first and second pivot angles is greater than eighty degrees.

7. The vacuum cleaner connector in claim 1, wherein said acute angle between said first longitudinal axis and said axis of rotation is substantially the same as said acute angle between said second longitudinal axis and said axis of rotation, whereby said first longitudinal axis can be rotated to be substantially parallel to said second longitudinal axis.

8. The vacuum cleaner connector in claim 7, wherein said first longitudinal axis and said second longitudinal axis intersect said axis of rotation at the same point, whereby the first and second longitudinal axises can be align to provide a substantially in-line configuration.

9. The vacuum cleaner connector in claim 5, wherein;
said elongated conduit is defined by a tapered interior surface and a tapered exterior surface;
wherein, said tapered interior surface tapers to a larger diameter toward the extent of said adaptor port end, and said tapered exterior surface tapers to a smaller diameter toward the extent of said adaptor port end, whereby the wall thickness of the adaptor port end is thinnest at the end of the adaptor port;
wherein, said tapered interior surface defines the air passageway and is designed for removable attachment by friction fit to a conduit style vacuum cleaner hose end;
wherein, said tapered exterior surface is designed for removable attachment by friction fit to a port style vacuum cleaner hose end.

10. The vacuum cleaner connector claim 9, wherein:
said tapered interior surface sized for proper fit over a standard 1.25 inch
diameter vacuum cleaner hose wand end.

11. The vacuum cleaner connector in claim 10, wherein:
said elongated tube is sized to fit into vacuum cleaner tools with
a standard 1.25 inch diameter connecting port.

12. The vacuum cleaner connector in claim 1, wherein:
said means for creating friction comprises a notch and tab configuration defined on said adaptor pivot end and said tool pivot end, wherein at least one tab on one pivot end communicates with at least one notch on the other pivot end and providing sufficient holding friction for proper use of vacuum tools attached to said tool port end.

13. A vacuum cleaner connector for removable attachment between a vacuum cleaner hose and a vacuum cleaner tool, comprising:

a) an adaptor member;
b) a tool member, and
c) a means for pivotally attaching said adaptor member to said tool member having a third air passageway therethrough;
d) wherein, said adaptor member having an adaptor port end opposite said means for pivotally attaching, said adaptor port end defining an elongated cylindrical conduit having an interior surface defining a first air passage therethrough and an exterior surface;
e) wherein, said interior surface defining a taper of less than five degrees for removable attachment by friction fit to a conduit style vacuum cleaner hose end;
f) wherein, said exterior surface defining a taper of less than five degrees for removable attachment by friction fit to a port style vacuum cleaner hose end;
g) wherein, said tool member comprises a tool port end defining an elongated tube with a taper of less than five degrees and a second air passage therethrough for removable attachment by friction fit to a vacuum cleaner tool;
h) wherein, said first, and second air passage are connected together by the third air passageway to provide a substantially sealed and continuous air passageway from said adaptor port end to said tool port end for conducting suction air into said tool port end, through said tool member, through said means for pivotally attaching, through said adaptor member, out said adaptor port end and finally into the vacuum cleaner hose;
i) wherein, said means for pivotally attaching defines a pivot axis that is between thirty and sixty degrees off-axis from the direction of elongation of both said tool port end and said adaptor port end and where exists less than ten degrees difference between the tool port end and the adaptor port end off-axis angle, whereby pivoting of the tool member with respect to the adaptor member changes the angle between the longitudinal direction of said adaptor port end and tool port end.

14. The vacuum cleaner connector in claim 13, wherein:
said means for pivotally attaching also defining a means for providing a friction force that resists relative rotation of the members around said pivot axis by frictional contact of at least two sliding surfaces on said means for pivotally attaching, and providing the proper amount of friction to hold said adaptor member and said tool member together at a stable angle during cleaning.

15. The vacuum cleaner connector in claim 14, wherein:
said means for pivotally attaching further including a notch and tab configuration, wherein said notch and tab configuration comprising at least one notch and at least one tab, wherein the notch may communicate with the tab to provide specific pivot angles with sufficient holding friction for proper use of vacuum tools attached to said tool port end.

16. The vacuum cleaner connector in claim 13, wherein:
wherein, said interior surface tapers to a larger diameter and said exterior surface tapers to a smaller diameter as one moves from said means for pivotally attaching to said adaptor port end, whereby the wall thickness of the adaptor port end is thinnest at the end of the adaptor port.

17. The vacuum cleaner connector in claim 13, wherein:
said elongated cylindrical conduit having tapered interior and exterior surfaces designed for attachment to multiple sizes of conduit style vacuum cleaner hose ends and multiple sizes of port style vacuum cleaner hose ends respectfully.

18. A vacuum cleaner connector for removable attachment to a vacuum cleaner hose end, comprising:
   a) a tool end with an attachment surface having less than five degrees of taper for mounting a vacuum cleaner tool by friction fit;
   b) an adaptor port end opposite said tool end, and
   c) a continuous air passageway defined from said tool end to said adaptor port, whereby suction air may flow between said vacuum cleaner tool and said vacuum cleaner hose end;
   d) wherein, said adaptor port end defines an elongated conduit having an interior surface and an exterior surface;
   e) further including, a means of interior attachment for connecting said interior surface to a male conduit style vacuum cleaner hose end with a substantially airtight seal; and
   f) further including, a means of exterior attachment for connecting said exterior surface to a female port style vacuum cleaner hose end with a substantially airtight seal.

19. The vacuum cleaner connector in claim 18, wherein: both said means of interior attachment and said means of exterior attachment define surfaces with less than five degrees of taper for removable attachment by friction fit to the male and female hose ends respectfully.

20. The vacuum cleaner connector in claim 18, further including a pivot joint defined on said vacuum cleaner connector between said adaptor port end and said tool end; wherein said pivot joint defines a means for changing the relative orientation between the adaptor port end and the tool end, whereby the relative orientation between the vacuum cleaner hose end and the vacuum cleaner tool is adjustable by rotating said pivot joint.

* * * * *